(12) United States Patent
St. Denis (10) Patent No.: US 9,506,331 B2
(45) Date of Patent: Nov. 29, 2016

(54) RECIPROCATING PUMP DRIVE APPARATUS FOR OPERATING A DOWNHOLE PUMP VIA A ROD STRING

(76) Inventor: Perry St. Denis, Lloydminster (CA)

( * ) Notice: Subject to any disclaimer, the term of this patent is extended or adjusted under 35 U.S.C. 154(b) by 1214 days.

(21) Appl. No.: 13/411,294

(22) Filed: Mar. 2, 2012

(65) Prior Publication Data

US 2012/0222506 A1    Sep. 6, 2012

Related U.S. Application Data

(60) Provisional application No. 61/448,368, filed on Mar. 2, 2011.

(51) Int. Cl.
*E21B 43/12* (2006.01)
*F16H 21/36* (2006.01)
*F16H 21/32* (2006.01)
*F04B 53/00* (2006.01)
*F04B 47/02* (2006.01)

(52) U.S. Cl.
CPC ............. *E21B 43/127* (2013.01); *F16H 21/32* (2013.01); *F16H 21/36* (2013.01); *F04B 47/026* (2013.01); *F04B 53/006* (2013.01); *Y10T 74/18216* (2015.01)

(58) Field of Classification Search
CPC .................. Y10T 74/18472; Y10T 74/18216; F16H 21/50; F16H 21/36; F16H 21/32; F04B 53/006; F04B 47/026; F04B 47/03; E21B 43/127
USPC ........................................................... 74/45
See application file for complete search history.

(56) References Cited

U.S. PATENT DOCUMENTS

| | | | | |
|---|---|---|---|---|
| 79,035 A | * | 6/1868 | Waddell | F04B 9/02 74/45 |
| 217,263 A | * | 7/1879 | Brown | B63H 1/32 416/68 |
| 477,469 A | * | 6/1892 | Tarpenning et al. | F04B 9/02 74/45 |
| 619,824 A | * | 2/1899 | Fetzer | F16H 25/16 74/45 |
| 760,596 A | * | 5/1904 | Fulton | F04B 9/02 74/45 |
| 771,005 A | * | 9/1904 | Fetzer | F04B 9/02 74/45 |
| 1,219,093 A | * | 3/1917 | Car | F04B 9/02 74/45 |
| 1,326,024 A | * | 12/1919 | Card | F04B 9/02 74/103 |
| 1,486,589 A | * | 3/1924 | Kessler | F04B 9/025 74/44 |
| 1,509,641 A | * | 9/1924 | Dayton | F04B 35/00 74/41 |
| 1,512,726 A | * | 10/1924 | Turnsek | F04B 9/025 74/37 |
| 1,518,793 A | * | 12/1924 | Huss | F04B 9/02 74/45 |

(Continued)

*Primary Examiner* — Randell J Krug
(74) *Attorney, Agent, or Firm* — Kyle R. Satterthwaite; Ryan W. Dupuis; Ade & Company Inc.

(57) ABSTRACT

A reciprocating pump jack employs a crank arrangement to drive a polish rod carrier up and down, and employs guide slots in side walls of a frame structure at both ends of the carrier in order to maintain tight control over the orientation of the polish rod.

7 Claims, 7 Drawing Sheets

(56) References Cited

U.S. PATENT DOCUMENTS

| | | | | |
|---|---|---|---|---|
| 1,540,704 A * | 6/1925 | Nicholas | F04B 9/025 | 74/45 |
| 1,718,990 A * | 7/1929 | Van Winkle | F04B 47/022 | 74/45 |
| 1,723,041 A * | 8/1929 | Johnson | F04B 9/04 | 184/4 |
| 2,017,169 A * | 10/1935 | Slader | F04B 9/04 | 74/41 |
| 2,021,639 A * | 11/1935 | Robinson | F04B 9/04 | 74/45 |
| 2,025,433 A * | 12/1935 | Bolagek | F04B 47/02 | 74/44 |
| 2,109,721 A * | 3/1938 | Drevlow | F04B 47/02 | 74/45 |
| 2,196,774 A * | 4/1940 | Lundgren | F04B 9/02 | 74/45 |
| 2,431,493 A * | 11/1947 | McIlrath | F16H 21/18 | 74/45 |
| 2,573,753 A * | 11/1951 | Spangberg | F04B 47/02 | 184/9 |
| 2,694,933 A * | 11/1954 | Blackburn | F04B 47/02 | 74/37 |
| 3,227,227 A * | 1/1966 | Backman | E21B 1/02 | 173/55 |
| 4,195,581 A * | 4/1980 | Ohara | D05B 3/243 | 112/102.5 |
| 4,400,984 A * | 8/1983 | Ronbeck | B21D 43/105 | 414/752.1 |
| 2010/0071585 A1* | 3/2010 | Wright | B61C 7/04 | 105/35 |

* cited by examiner

RECIPROCATING PUMP DRIVE APPARATUS FOR OPERATING A DOWNHOLE PUMP VIA A ROD STRING

CROSS REFERENCE TO RELATED APPLICATIONS

This application claims benefit under 35 U.S.C. 119(e) of U.S. Provisional Patent Application Ser. No. 61/448,368, filed Mar. 2, 2011.

FIELD OF THE INVENTION

The invention relates generally to a mechanism transforming rotary motion to vertical motion, and more particularly to an apparatus producing reciprocating pump motion to assist production of fluids from a well.

BACKGROUND OF THE INVENTION

Production of fluids from a well is often assisted or achieved by operation of a downhole pump that forces fluids up toward the surface. Reciprocal drive downhole pumps are operated via a string of rods (sucker rods) that depend down into the well from the surface, where the string is reciprocated up and down along the axis of the wellbore by above-surface drive equipment. The most common conventional downhole reciprocal pump drive equipment configuration is the walking beam pump jack, which is often installed atop a concrete pad and may be further supported by piles, thus requiring significant preparation and resulting in notable ground disturbance.

Other prior art alternatives include hydraulic pump jacks that employ hydraulic cylinders bolted onto the wellhead to perform the required reciprocation of the pump rod string. However, shortcomings of such configurations may include lack of a smooth transition to the rod string between the up and down strokes, leaking fluids, and the potential of the hydraulic cylinders to rust because of oxidization and exposure to the elements.

Accordingly, there is a desire for a more efficient method to pump fluid without involving electrical/mechanical switches to change stroke direction or maintain stuffing box alignments. Such a solution would likely reduce premature stuffing box wear and hydraulic cylinder bearing wear as well as electrical/mechanical shut downs.

SUMMARY OF THE INVENTION

According to one aspect of the invention there is provided a reciprocating pump drive apparatus for operating a downhole pump via a rod string, the apparatus comprising:

a frame comprising a base portion arranged for coupling to a wellhead to mount the apparatus thereon and an upright portion extending upwardly away from the base portion;

a first guide slot formed in the upright portion of the frame and extending upwardly away from the base portion of the frame;

a crank rotatably carried on the frame and horizontally spaced from the guide slot in the upright portion of the frame;

a carrier device movably engaged in the first guide slot for movement therealong and arranged to carry a pump rod in a position depending downward from the carrier device;

a carrier support device comprising a second guide slot that is maintained perpendicular to the first guide slot and in which the carrier device is also movably engaged for movement along the second guide slot;

a drive arm device having a pivotal connection to the frame at position between a rotational axis of the crank and the guide slot in the upright portion of the frame, the drive arm device being pivotally connected to the carrier support device at a location between a first side end of the drive arm and the pivotal connection to the frame and having a longitudinal slot located between a second end of the drive arm device and the pivotal connection to the frame, the crank and the pivotal connection of the drive arm having pivot axes that lie in a common plane perpendicular to a length of the first guide slot;

a crank pin projection carried on the crank for revolution about the rotational axis thereof under rotation of the crank and projecting laterally away from the crank into the longitudinal slot in the drive arm device at a lesser radial distance from the rotational axis than the pivotal connection of the drive arm to the frame, the crank pin projection being movably engaged in said longitudinal slot for movement therealong;

whereby rotation of the crank raises and lowers the second end of the drive arm, which in turn raises and lowers the first end of the drive arm in opposition to the raising and lowering of the second end of the drive arm, thereby moving the carrier support upward and downward to reciprocate the carrier and the pump rod upward and downward along the first guide slot.

Preferably the upright portion of the frame comprises two side wall portions and the first guide slot is defined by a first pair of parallel guide slots disposed respectively in the two side wall portions, the carrier device spanning between the two side wall portions.

Preferably the carrier support device comprises two supports disposed respectively adjacent the two side wall portions of the frame and the second guide slot is defined by a second pair of parallel guide slots disposed respectively in the two carrier supports, the carrier device spanning between the two carrier supports.

Preferably the drive arm device comprises a pair of drive arms that are disposed on opposite sides of the crank and each comprise a respective longitudinal slot into which extends a respective crank pin projection.

Preferably the base of the frame comprises a mounting plate disposed at a bottom end of the upright portion, the first longitudinal slot extending perpendicular to the mounting plate.

Preferably the base of the frame underlies the carrier device and comprises an opening therein for passage of the pump rod through said opening.

Preferably the base comprises bolt holes disposed around said opening for receipt of fasteners through said bolt holes to secure the base to a stuffing box or pedestal stand attached to the wellhead.

Preferably there is provided a second arm device extending parallel to the drive arm device to cooperate with the drive arm device, the frame and the carrier support device to form a parallelogram linkage that maintains a consistent orientation of the carrier support device throughout motion of the linkage under rotation of the crank to keep the second guide slot perpendicular to the first guide slot.

Preferably axes about which the drive arm and second arm devices respectively pivot relative to the frame are spaced apart only vertically to maintain a vertical orientation of the carrier support device between pivotal connections of said carrier support device to said arm devices.

Preferably there is provided a drive source coupled to the crank and operable to drive rotation thereof, the drive source being mounted to the frame below the drive arm device and between the crank and the upright portion of the frame.

Preferably the drive source is coupled to the crank via a drive belt.

Preferably there is provided at least one lifting ring formed on the frame, by which the apparatus is suspendable for lowering onto a wellhead for installation.

Preferably there is provided a splash guard mounted to the frame at the upright portion thereof.

Preferably the crank pin projection comprises a cam follower rollably engaged in said longitudinal slot.

Preferably the carrier device comprises a first cam follower rollably engaged in said first guide slot.

Preferably the carrier device comprises a second cam follower rollably engaged in said second guide slot.

According to another aspect of the invention there is provided a reciprocating pump drive apparatus for operating a downhole pump via a rod string, the apparatus comprising:

a frame comprising a base portion arranged for coupling to a wellhead to mount the apparatus thereon and an upright portion extending upwardly away from the base portion, the upright portion of the frame comprising two side wall portions;

a first pair of parallel guide slots respectively formed in the two side wall portions of the upright portion of the frame and extending upwardly away from the base portion of the frame;

a crank supported on the frame for rotation about a rotational axis of the crank;

a carrier device movably engaged in the first pair of parallel guide slots for movement therealong and arranged to carry a pump rod in a position depending downward from the carrier device;

a drive arm device coupled to the carrier device adjacent a first end of the drive arm device, coupled to the crank adjacent second ends of the drive arm devices, and being arranged to convert rotational motion of the crank into reciprocating linear motion of the carrier device along the first pair of parallel slots in the upright portion of the frame to drive reciprocation of the pump rod.

The rotational axis of the crank may be positioned overhead of the carrier device and the drive arm devices depends downward from the crank to connect to the carrier device.

The drive source may be coupled to the crank through a beltless gear train.

Preferably the drive arm device connects to the carrier device on both sides of where the carrier device connects to the pump rod.

Preferably the drive arm device comprises two separate drive arms each connecting on respective side of where the carrier device connects to the pump rod.

According to yet another aspect of the invention, there is provided a reciprocating pump drive apparatus for operating a downhole pump via a rod string, the apparatus comprising:

a frame comprising a base plate having an opening therein to accommodate passage of the rod string through said base plate, and two parallel side walls standing vertically upright from the base plate at opposing sides thereof, said base plate having a plurality of bolt holes disposed around said opening for bolting of said frame to a wellhead in a mounted position thereon;

a pair of parallel vertical guide slots opening through the two side walls of the frame and extending upwardly away from the base plate of the frame;

a crank supported by at least one of the side walls for rotation about a rotational axis of the crank at a position between said side walls;

a carrier device comprising a carrier bar and a pair of guide followers rotatably carried on the carrier bar adjacent opposing ends thereof and each movably engaged in a respective one of the pair of parallel vertical guide slots for movement therealong, the carrier bar being arranged to carry a pump rod in a position depending downward therefrom through the opening in the base plate;

a drive arm device coupled to the carrier bar adjacent a first end of the drive arm device, coupled to the crank adjacent a second end of the drive arm device, and being arranged to convert rotational motion of the crank into reciprocating linear motion of the carrier device along the first pair of parallel slots in the side walls of the frame to drive reciprocation of the pump rod; and a drive source mounted to at least one of the side walls and coupled to the crank to drive rotation thereof;

wherein the rotational axis of the crank is situated directly overhead of the carrier bar in a position spaced only vertically, and not horizontally, therefrom such that the carrier bar and the rotational axis of the crank reside in a same vertical plane that crosses perpendicularly through the side walls of the frame.

BRIEF DESCRIPTION OF THE DRAWINGS

In the accompanying drawings, which illustrate exemplary embodiments of the present invention.

DETAILED DESCRIPTION

The mechanical pump jacks shown in the drawings are each configured to be fastened onto a wellhead flange by way of a conventional stuffing box flange or pedestal stand that is mounted on the wellhead flange to present a base plate for supporting the apparatus above the stuffing box. Base plate 2 of the pump jack apparatus is bolted to the top of the pedestal stand or stuffing box. The polish rod 1 extends upwardly through the stuffing box of the wellhead to the pump jack apparatus, where it continues through an opening in the base plate 2 and then upwardly through a carrier bar 21. Polish rod 1 is secured to the carrier bar 21 for reciprocal up and down movement therewith through a combination of gravity and a clamp 19 (FIG. 4) fastened to the polish rod 1 above the carrier bar 21. As a motor 16 of the apparatus (which may be hydraulic or electric) rotates, its output shaft drives the input of a planetary gearbox 17, the output shaft of which has a sheave 20 on its end for driving a belt 15. The planetary gearbox 17 is bolted on a planetary support bracket 18. The belt 15 wraps around the planetary sheave 20. The belt 15 then is wrapped around a crank sheave 12. A belt tensioner 14 is used to keep sufficient pull on the belt 15 as it rotates around the crank sheave 12. The motor and the planetary gearbox 17 will rotate the sheave 20, which moves the belt 15 that drives the crank sheave 12. The crank sheave 12 will rotate the same direction as the sheave 20. As the crank sheave 12 rotates, a respective cam follower 11 carried on each side of the crank sheave 12 to revolve about the crank sheave axis under rotation of the sheave moves along a recessed or cut-out slot 22 in a respective pitman drive arm 9 on the same side of the sheave. A pivot shaft 13 which pivotally carries the pitman arms 9 on side walls of the apparatus frame allows the pitman arms 9 to rise at one end while lowering at the other, and vise versa. As the geometry of the crank sheave 12 and attached cranks 10 rotate to pivot the parallel pitman drive arms 9, it lowers the rear end of the pitman arms at the crank wheel and raises the carrier bar at the front end of the pitman arms upwards, and vise versa.

As the front end of pitman arms 9 is rising, carrier bar supports 3 (each fastened to a respective one of the pitman arms) rise. The carrier bar 21 has a cam follower 4 attached to it on each end. The cam follower 4 experiences horizontal motion relative to the carrier support 3 within a carrier support slot 3a therein to accommodate the change or orientation of the pitman arm without straining the polish rod 1. On each side of the apparatus, a carrier bar support arm 7 keeps the carrier support 3 vertical to maintain the horizontal orientation of its slot 3a. When the cam follower 11 reaches its turning (i.e. direction reversing) point in the cut out slot 22 on the pitman arm 9, the polish rod 1 begins to go downward. When the polish rod 1 is going downward the clamp 19 (fastened above the carrier bar 21) travels down with the carrier bar 21, as the weight of the polish rod and clamp act to keep the clamp seated atop the carrier bar 21. Thus, as the front end of the pitman arms 9 lower, the polish rod 1 lowers. Once this happens, the process happens all over again.

Figure 1:
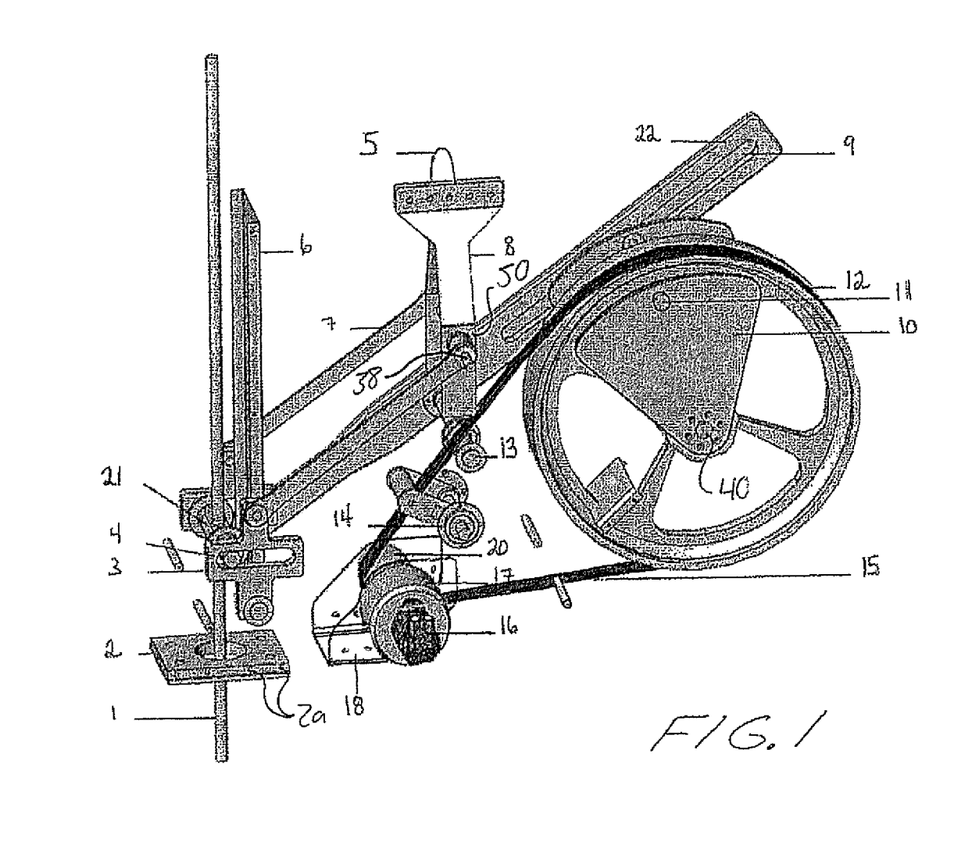
FIG. 1 is a partial perspective view of a first embodiment pump jack apparatus of the present invention for driving a downhole pump via a sucker rod string, frame side walls and one drive arm having been omitted for illustrative purposes.

Referring to FIG. 1, a lifting support bracket 8 has a lifting ring 5 which is used to lift the machine when attaching to the wellhead. A splash pan 6 is used to prevent residue from collecting on the rest of the machine. Typically this is caused by a stuffing box or a Polish rod scoring. Although described above as employing belts and sheaves to transfer output from the motor to a drive crank, this machine may alternatively employ a gear train, for example housed in a hollow metal gearbox, instead of belts and sheaves to complete this rotational coupling between the motor and crank.

Further detail of the pumpjack apparatus will now be described with reference to the drawings.

Figure 2:
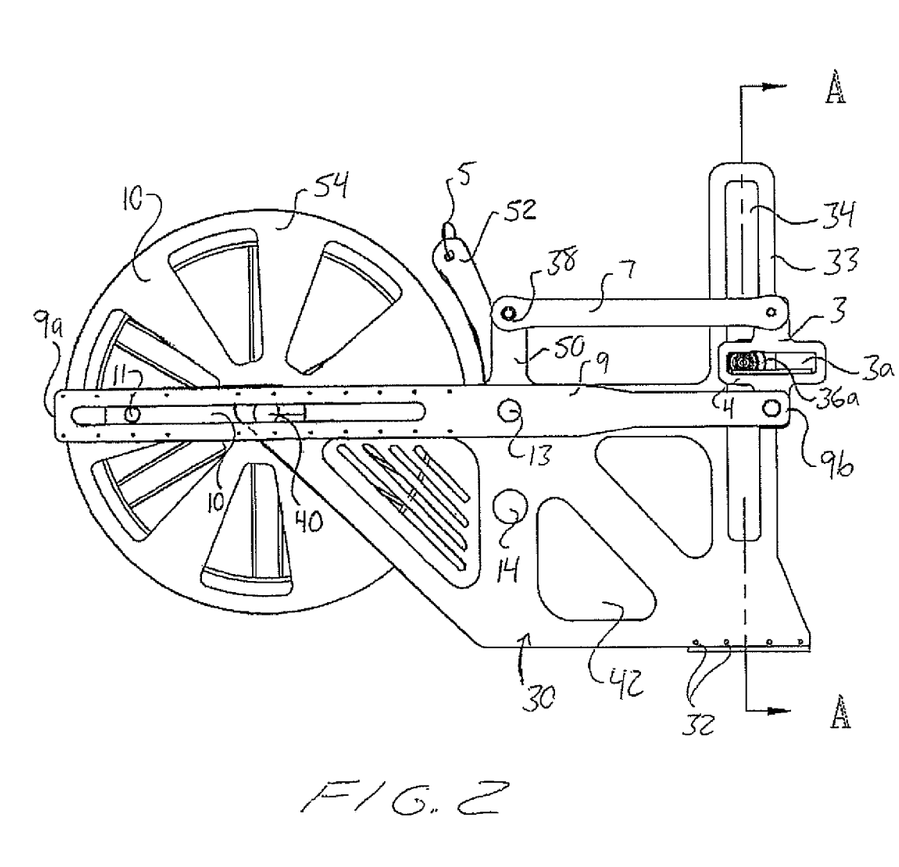
FIG. 2 is a partial side elevational view of a second embodiment pump jack apparatus of the present invention, which is similar to that of FIG. 1, this partial view including the missing side walls and drive arm of FIG. 1 while omitting some drive system components present in FIG. 1.
Figure 3:
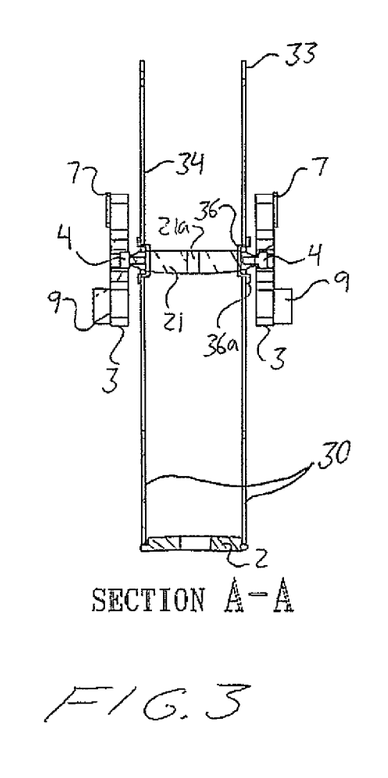
FIG. 3 is a cross-sectional view of the pump jack apparatus of FIG. 2 as taken along line A-A thereof.

In addition to the base plate 2 and planetary bracket 18 of FIG. 1, the frame of the apparatus features a pair of identical planar vertical side walls 30, which are shown in FIGS. 2 and 3 and are parallel and aligned with one another in respective vertical planes. At a front end of the side walls, the base plate 2 spans horizontally between, and is fixed to, the side walls 30 at their bottom ends, for example by bolts fastened into threaded holes 2a in side edges of the base plate 2 through bolt holes 32 in the side walls 30. Each side wall 30 has a vertically upright portion 33 projecting upward from the base plate 2, as shown in FIG. 2, and each such upright portion 33 features a vertically extending longitudinal guide slot 34 cut through it. A respective one of the two carrier supports 3 resides adjacent the outer face of each side wall 30 a short distance therefrom, with a portion of the horizontal guide slot 3a of the carrier support 3 overlapping the vertical guide slot 34 at any given time.

In the first two illustrated embodiments, each carrier support 3 is a cross-shaped metal plate having pivotal connections to the front ends of the drive arm 9 and carrier support arm 7 at the bottom and top ends, respectively, of its vertically crossing portion, and having its guide slot 3a formed in the horizontal crossing portion. The two arms 7, 9 are disposed to the outer side of the carrier support, i.e. on the side thereof opposite the respective side wall 30 of the apparatus frame. As best shown in FIGS. 1 and 3, the carrier bar 21 extends horizontally between the two side walls 30 of the frame, extending its ends outwardly through the vertical guide slots 34 therein. At each of these ends of the carrier bar 21 outside the frame side walls 30, a respective cam follower 4 is rotatably journaled in the end of the carrier bar and disposed within the horizontal guide slot 3a of the respective carrier support 3 to roll back and forth in the guide slot 3a against the different horizontal edge boundaries thereof during operation of the machine.

Where the carrier bar 21 passes through each vertical guide slot 34 in the upright portion 33 of the respective side wall 30 of the frame, a larger follower 36 is rotatably journaled around the carrier bar 21 to likewise rollingly ride up and down the vertical guide slot 34 against the different vertical boundary edges thereof during operation of the machine. As shown in FIGS. 2 and 3, an outer end of each vertical slot follower 36 features an outwardly extending flange 36a having an outer diameter exceeding that of the rest of the follower and being larger than the width of the vertical guide slot 34. The flanges of the two vertical followers 36 thus define stops projecting outward from the carrier bar 21 at locations outward from the side walls 30 to limit lateral sliding of the carrier bar 21 in either direction and thereby block withdrawal of the carrier bar 21 from either vertical slot 34.

The pivot shaft 13 of the drive arm 9 is rotatably journaled in the two side walls 30 at a position spaced horizontally therealong from the vertical guide slot 34 therein. The pivot shaft 13 spans between the sidewalls and projects laterally outward therebeyond on each side, where it is then fixed to the respective one of the drive arms 9 to pivotally carry the drive arms on the frame for pivotal motion within respective parallel vertical planes on opposite sides of the frame. The pivot shaft is located at an elevation between the upper and lower ends of the vertical guide slot 34, and in the illustrated first and second embodiments, at a short distance below the halfway point of the vertical slot length. Another pivot shaft 38 is likewise rotatably mounted on the two side walls to project laterally outward from each and pivotally support the respective one of the two carrier support arms 7 for pivotal motion parallel to the respective drive arm 9 along the same vertical plane thereas. This support arm pivot shaft 38 is positioned at higher elevation than the drive arm pivot shaft 9 at a position directly overhead thereof (i.e. vertically, but not horizontally spaced, from the drive arm shaft 13 along the plane of the side wall).

With the two pivot shafts 13, 38 spaced apart only vertically, and the pivotal connections between each carrier support 3 and the two respective arms 7, 9 likewise being only vertically separated, the parallel arms 7, 9 on each side of the frame cooperate with the frame and the respective carrier support 3 to form a four bar parallel linkage: one bar defined by the drive arm 9 between its pivotal connections to the carrier support 3 and the frame's side wall, a second bar defined parallel to the first by the carrier support arm 7 between its pivotal connections to the carrier support 3 and the frame's side wall, a third vertical bar defined by the frame's side wall 30 between its pivotal connections to the two arms 7, 9, and a fourth vertical bar defined parallel to the third by the carrier support's vertical span between its pivotal connections to the two arms 7, 9. By way of this parallelogram linkage, the carrier support 3 is maintained in a constant vertical orientation, which positions its guide slot 3a in a constant horizontal orientation, throughout any pivotal motion of the arms 7, 9. The carrier support's slot 3a accommodates the relative horizontal displacement necessary between the carrier bar 21 and the carrier support 3 to allow the drive arm's arcuate motion about its pivot shaft to displace the carrier bar 21 along the linear vertical constraint defined by the engagement of the carrier bar followers 36 in the vertical guide slot 34.

The side walls 30 of the frame extend away from the vertical guide slot 34 past the pivot shafts 13, 38 of the arms 9, 7, where near a rear end of the side walls distal to the vertical guide slot 34, the crank sheave 12 is mounted on a horizontal shaft 40 rotatably journaled in the two side walls 30. The crank sheave 12 is disposed between the side walls, and its shaft 40 projects laterally outward past the side walls 30 where it carries a respective crank plate 10 that is fixed on the shaft 40 for rotation therewith in a plane perpendicular thereto. At a distance radially outward from the shaft 40, the crank plate 10 features a crank pin projecting laterally outward therefrom in a direction perpendicular to the crank plate to rotatably carry the cam follower 11 that is rollably engaged in the drive arm's longitudinal slot 22 that extends from near a rear end of the drive arm 9a to near the pivot shaft 13 thereof. The drive arm's pivot shaft 13 is located between the crank sheave and the vertical guide slot 34 along the side walls of the frame at a distance further radially outward from the crank shaft axis than the crank pin follower 11. The slot 22 in the drive arm 9 is long enough to accommodate travel of the crank pin follower 11 through full 360-degree rotation of the crank shaft 40 and attached crank sheave 12 and crank plate 10 (i.e. through full 360-degree revolution of the crank pin and crank pin follower around the crank shaft axis).

Comparing FIGS. 1 and 2, at least one of the side walls features an opening 42 located therein below the parallelogram linkage near the bottom of the side wall at a location between the vertical guide slot and the crank assembly to accommodate connection between the motor driven gearbox 17, located outward from one of the side walls, to the sheave 20 that is disposed between the two side walls 30 and aligns with the crank sheave suspended between the side walls at the rear of the machine. The gearbox support bracket 18 is bolted or otherwise fixed to the side walls to rotatably carry the sheave 22 between the side walls and mount the gearbox housing in a position extending laterally outward through the opening 42 in the side wall to the motor 16 coupled at the input end of the gearbox. Between the crank sheave 12 and this opening 42 for the drive source components, an additional mounting hole is provided in each side wall to accommodate support of the belt tensioner 14.

Figure 5:
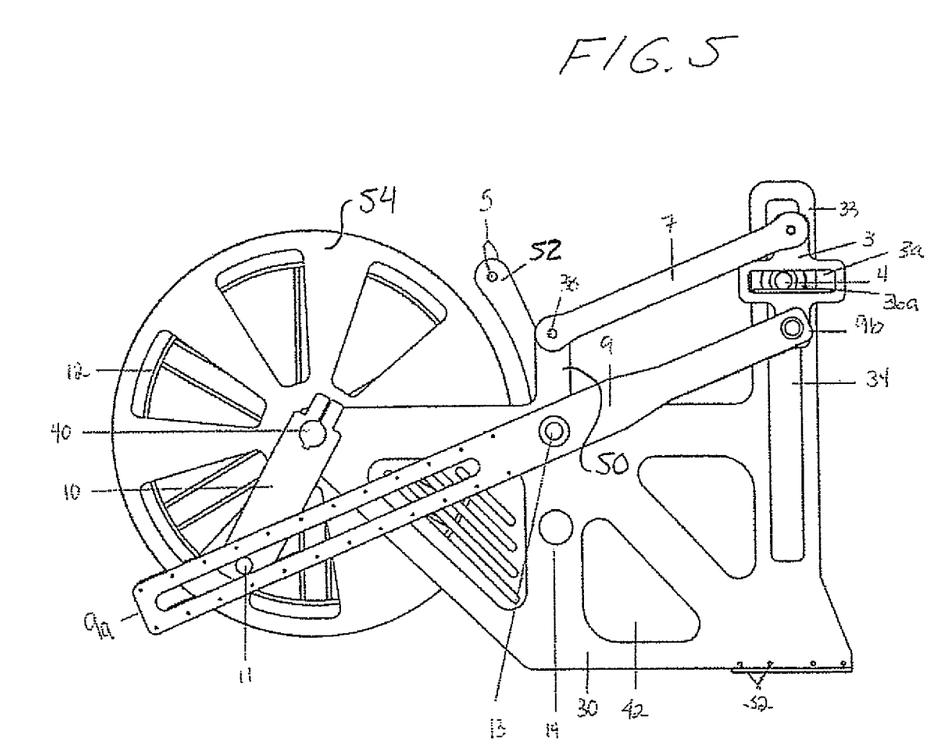
FIG. 5 is a side elevational view of the pump jack apparatus of FIG. 2 at another point in its pump rod reciprocation cycle.

FIG. 2 shows the parallelogram linkage and crank assembly in neutral positions situating the carrier bar 21 at a neutral midpoint of its reciprocating stroke along the vertical guide slot 34. Here, the crank pin follower 11 is horizontally inline with the equal-elevation crank shaft 40 and drive arm pivot shaft 13, thus positioning the drive arm 9 and parallel support arm 7 in horizontal orientations. The motor 16 is driven in a predetermined direction, and the gearbox output sheave 20 and the crank sheave 12 (and thus the crank shaft 40 and attached crank plate 10) are driven in the same direction. For example, with reference to FIG. 2, clockwise driven rotation of the sheaves would initially raise the crank pin follower 11 from its illustrated position rearward of the crank shaft 40, thus lifting the rear end 9a of the drive arm 9 and lowering the front end 9b of the drive arm, thereby driving the carrier assembly (carrier support, carrier bar and attached followers) near this front end 9b downward along the vertical guide slot 34 from the neutral position. As the crank pin follower 11 moves arcuately past its uppermost point in its revolution and begins moving downward, it reaches a point where its rolling engagement in the drive arm slot 22 begins pulling the rear end 9a of the drive arm downward. FIG. 1 shows the machine in an operation condition near this transition point, where the carrier assembly is at the lowermost extent of its travel along the vertical guide slot 34. From here, the lowering of the rear end of the drive arm under the effect of the crank pin follower lifts the front end of the drive arm 9, and thus also the carrier assembly, back up to their neutral positions with the crank pin follower 11 horizontally inline with (i.e. at equal elevation to) the crank shaft and drive arm pivot shaft. As the crank pin follower 11 passes downward through this neutral position, and continues to pull the rear end 9a of the drive arm 9 downward with it, the front end 9a of the drive arm and the carrier assembly continue to rise. As the crank pin follower 11 moves arcuately past its lowermost point in its revolution and begins moving upward, it reaches a point shown in FIG. 5 where its rolling engagement in the drive arm slot 22 begins pushing the rear end 9a of the drive arm upward, thereby lowering the drive arm front end 9b and carrier assembly from this uppermost point of their stroke back to the neutral position of FIG. 2. Continued rotation repeatedly drives this cycle, thus reciprocating the carrier assembly and attached polish rod through upward and downward strokes along the vertical guide slot 34.

Figure 4:
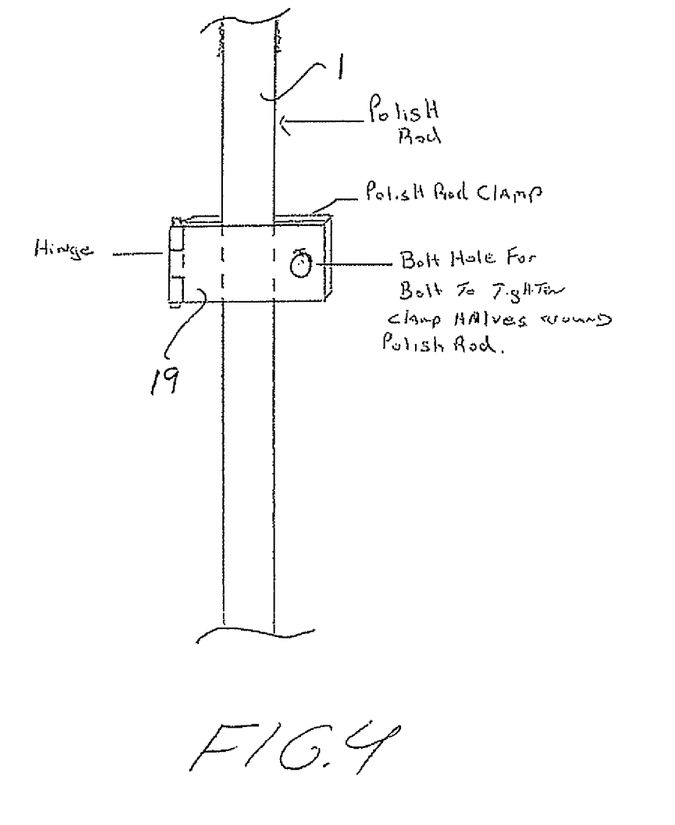
FIG. 4 is an elevational view of a polish rod of the pump jack apparatus of FIG. 1 or 2, illustrating installation of a clamp on the polish rod for use in securing the polish rod to a carrier bar of the apparatus.

The polish rod 1 extends through the carrier bar 21 at a through-hole 21a centrally positioned therealong, as shown in FIG. 3. FIG. 4 shows the clamp 19 fastened on the polish rod 1, which can be used at a position above the carrier bar 21 to block sliding of this clamped position of the polish rod 1 downward through the carrier bar, as the span of the clamp 19 outward from the polish rod exceeds the clearance between the polish rod circumference and the boundary of the carrier bar's through-hole 21a. In other words, the diameter of the clamp across the polish rod exceeds the diameter of the through-hole 21a. The illustrated clamp 19 features two halves that are hinged together and that feature channels of arcuate cross-section in sides of the halves that face together under closing of the hinge. The channels embrace against opposite sides of the polish rod's circumference as the halves are closed toward one another across the rod, and a bolt mechanism distal to the hinged-together ends of the halves is engagable between the halves after positioning thereof across the rod to draw the two halves closer together, thereby tightening the halves against the rod to clamp the rod between them. Clamped tightly on the rod, the clamp is seated atop the carrier bar 21, thereby hanging the lower end of the polish rod downward from the carrier bar. Below the stuffing box of the wellhead, the polish rod is coupled to sucker rods beneath it in a conventional manner to complete the pump rod string that is reciprocated by the pump jack machine to operate a reciprocally driven downwhole pump.

The splash pan 6 of FIG. 1 is mounted between the upright portions 33 of the frame side walls 30 of Figure behind the vertical guide slots 34 therein, i.e. to the side of the slot nearest crank assembly at the rear of the machine. The embodiments of FIGS. 1 and 2 differ only in some details of their structure, but operate for sucker rod string reciprocation in the same general manner. Some of the differences include the shape of the crank plates 10 and crank sheaves 12, the positioning in FIG. 1 of the lifting ring 5 on a lifting support bracket 8 formed by joining together the upstanding parts 50 on the side walls that pivotally carry the support arms 7 instead of on a separate upright 52 in FIG. 2, the presence of a crank sheave protective guard 54 fixed to the inside of each side wall 30 in FIG. 2, and the difference between a through-slot vs. recessed-slot in the drive arm 9 for receiving the crank pin follower 11. Other possible variations include, but are not limited to, use of slider and slot engagement versus a rolling cam follower and slot engagement for constrained relative movement of elements, use of vertical versus non-vertical obliquely sloped orientation of the linkage bars formed by the frame and the carrier support in the parallelogram linkage while still maintaining the carrier support slot in a horizontal orientation perpendicular to the frame's vertical guide slot, and positioning of the support arm below versus above the drive arm.

FIGS. 6 to 9 illustrate a third embodiment pump jack apparatus. Like the other embodiments, the frame features two planar vertical side walls 30a, 30b projecting upward at opposite sides of a base plate 2, but each side wall extends only upward from the base plate 2, and not in any horizontal direction therefrom. The two side walls 30a, 30b share a common overall shape, with obliquely oriented sides 102 that diverge from one another in an upward direction in a symmetric manner across a vertical axis located centrally between them. The perimeter of each side wall is completed by an arcuate upper edge 104 spanning over 180-degrees to convexly interconnected the linearly sloped side edges. At its central vertical axis, each side wall 30a, 30b features a vertically extending longitudinal guide slot 34 cut through it, like in the preceding embodiments for the same purpose of guiding the cam followers 36 of the carrier bar 21. In the third embodiment, the outer flange 36a of each cam follower extends outward past linear guide tracks 100 mounted on opposing vertical sides of the vertical guide slot 34 to lie at least partially inward from the sides of the slot on the outside of the respective side wall.

Figure 7:
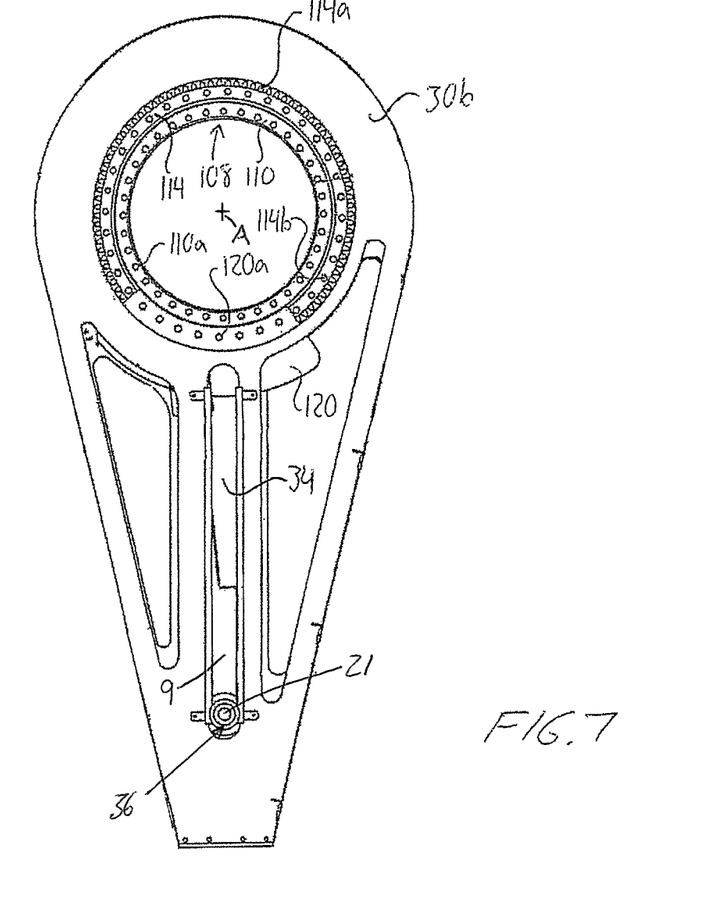
FIG. 7 is a first side elevational view of the third embodiment pump jack apparatus, but with the drive crank thereof in a different rotational position.
Figure 8:
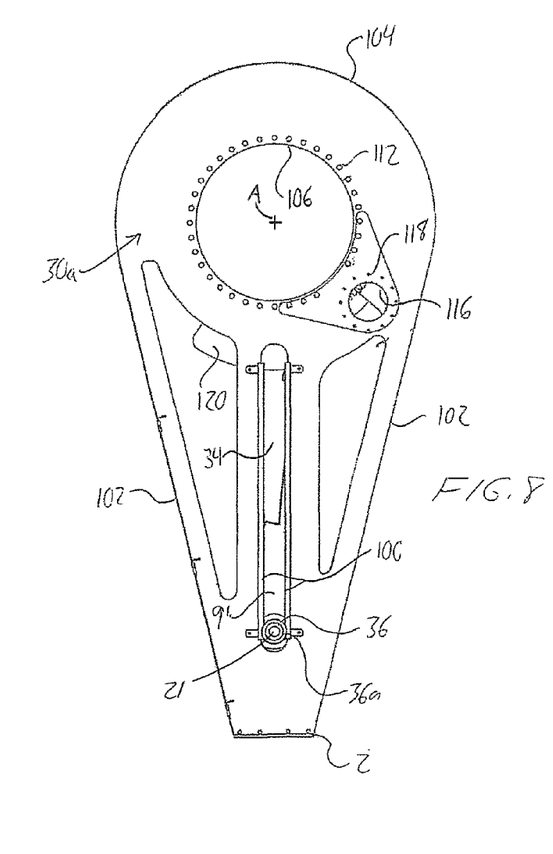
FIG. 8 is a second side elevational view of the pump jack apparatus of FIG. 7 from the opposing side thereof, with a motor and gearbox thereof omitted.
Figure 9:
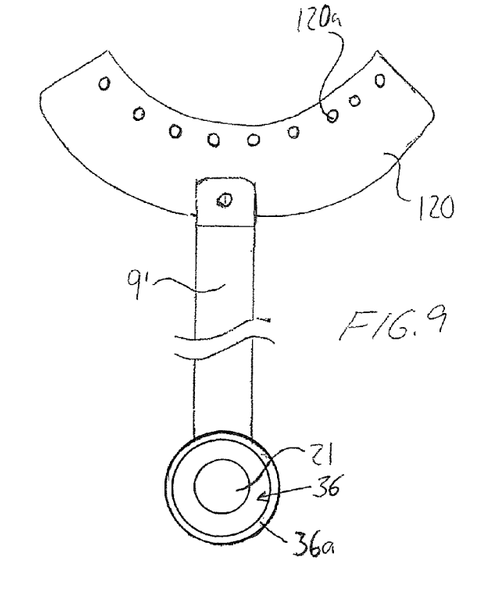
FIG. 9 is a schematic elevational view of a carrier bar support arrangement of the pump jack apparatus of FIGS. 6 to 8.

With reference to FIG. 8, one of the side walls 30a features a circular through hole 106 that lies concentric with the radial center of the arcuate upper edge 104 of the wall 30a. Referring to FIG. 7, the other side wall 30b features a larger circular through hole concentric with that of the other wall. A slewing bearing 108 has its annular inner race 110 fixed to the inner face of the first side wall 30a around the circular hole 106 therein, for example through bolt holes 110a passing axially through the inner race 110 and matching bolt holes 112 in the side wall 30a. In a known manner, the outer annular race 114 of the slewing bearing 108 closes around the inner race thereof, is rotatable around the inner race and has gear teeth 114a defined at the outer circumference of the race 114.

Figure 6:
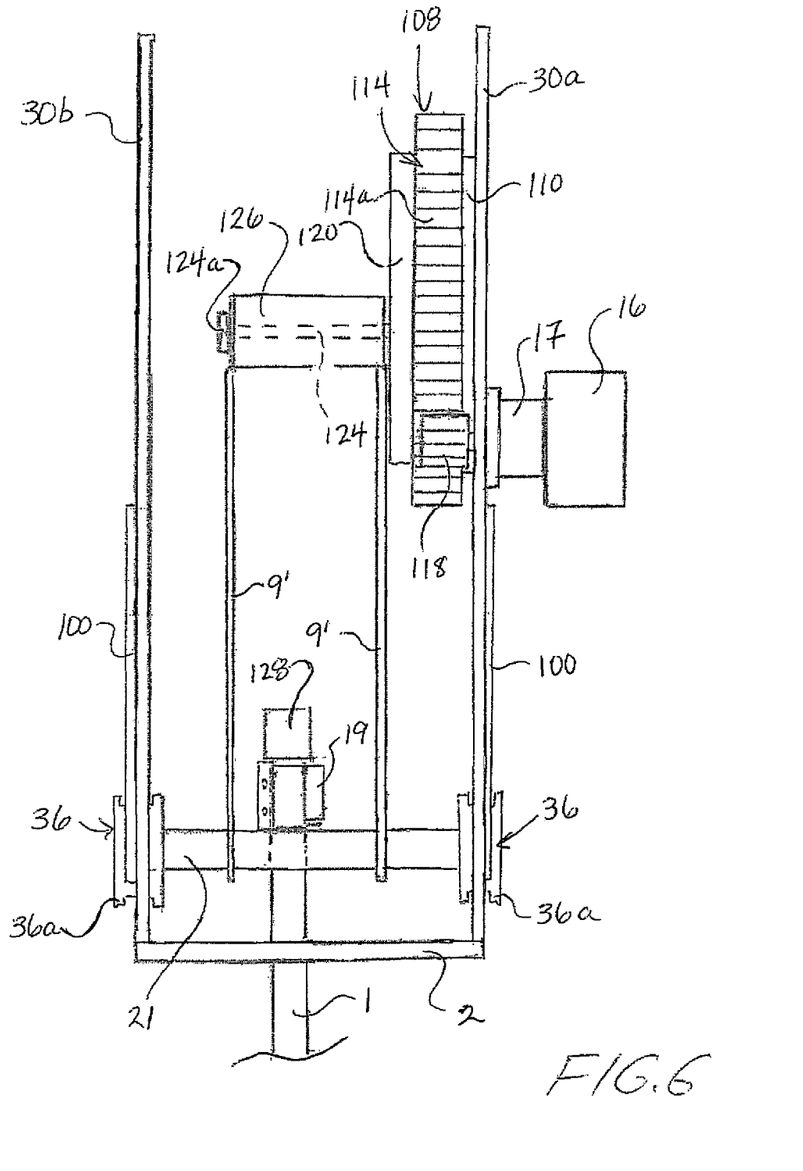
FIG. 6 is a schematic front elevational view of a third embodiment pump jack apparatus.

Referring to FIG. 8, a smaller hole 116 located radially outward from the central hole 106 in the top portion of the first side wall 30a is surrounded by bolt holes 118 spaced around the circumference of this smaller hole for mounting of a gearbox 17 and motor 16 to the exterior face of the first side wall 30a, as shown in FIG. 6. An output shaft of the gearbox 17 passes through the hole 116 in the side wall 30a and carries an output gear 118 in the space between the two side walls 30a, 30b. This output gear 118 of the gear box engages with the teeth 114a of the outer race 114 of the slewing bearing 108. Accordingly, operation of the motor drives rotation of the slewing bearing's outer race.

On an annular inner face of the movable outer race 114 of the slewing bearing, i.e. on the side of the outer race facing the second side wall 30b, is mounted a flat or plate-like and arcuately shaped spacer 120 having bolt holes 120a spaced therealong for cooperation with axial bolt holes 114b circumferentially spaced around the outer race 114 of the slewing bearing. A bolt 124 has the threaded free end of its shaft engaged in a threaded hole in the spacer 120, but leaves a substantial portion of the shaft length project from the spacer in a direction parallel to the axis of the slew bearing at a radial distance outward therefrom. A sleeve or hollow block 126 is rotatable disposed on the shaft of the bolt between the bolt head 124a and the spacer 120.

The drive arms 9' of the third embodiment are fixed to respective ends of the sleeve 126 to suspend the drive arms from the shaft of the bolt 124 in a manner pivotal thereabout. Accordingly, the outer race of the slewing bearing defines the crank of this embodiment, with the bolt thus defining the crank pin about which the drive arms 9' are pivotal at one end. The rotational axis of the stewing bearing lies in the same vertical plane as the axis of the carrier bar 21, and so horizontally-slotted carrier bar support of the first two embodiments is not needed in the third embodiment. Accordingly, the second ends of the drive arms 9' are pivotally coupled directly to the carrier bar, requiring only pivotal motion of the drive arms 9' about the axis of the carrier bar to accommodate linear motion thereof along the vertical guide slots in the side walls of the frame under rotation of the slewing bearing.

An unillustrated earlier prototype of third embodiment featured a single drive arm structure with a single connection to the crank pin bolt 124 and a branched or forked lower end that split to connect to the carrier bar 21 on opposite sides of the polish rod 1. However, the illustrated embodiment with two entirely separate drive arms located entirely on respective sides of the polish rod 1, and thus separately connecting to the crank pin bolt 124 at spaced positions therealong, is preferred so as to provide maximum space above the carrier bar 21 to maximize the accommodation of movement of the top end of the polish rod 1 above the carrier bar 21. This prevents the polish rod from bending when it is not traveling with the carrier bar downwards due to waxing/sanding of the well or downhole issues. In such situations, the polish rod is in the air and while the carrier bar moves upwards. The separate, spaced-apart carrier bar support/drive arms 9' allow the polish rod to go between the two arm supports. This prevents bending of the polish rod and wellhead damage. The top end of the polish rod 1 may be equipped with a threaded polish rod coupling, as shown in FIG. 6 at 128.

The third embodiment shares the two-sided support and guidance of the of the polish rod carrier bar 21 for optimal performance in maintaining the desired orientation of the polish rod, but avoids the need for the additional horizontal guide slots of the first two embodiments by having the rotational axis of A the crank located directly overhead of the carrier (i.e. by having the crank vertically, but not horizontally spaced from the vertical guide slots at which the carrier bar runs up and down the side walls of the frame). Although omitted for illustrative purposes, it will be appreciated that the two side walls of the frame are preferably linked by cross-bars, plates, grates or other members at locations along the edges of the plates around the components located therebetween to provide rigidity to the structure, and to provide protection from the moving parts therebetween. Of course, closure panels spanning between the walls at one more locations would preferably be removable to allow access to the internal components. The third embodiment also illustrates that the invention is not limited to a belt drive configuration like the first two embodiments. Through testing of prototypes of the different embodiments, the belt drive of the first two has proven less reliable than the gear driven third embodiment.

It will be appreciated that different components from the different embodiments may combined in arrangements not illustrated herein. For example, a further embodiment could employ the more horizontally-oriented design of the first two embodiments where the crank is horizontally spaced from the guide slot of the polish rod carrier, and thus may use the correspondingly slotted drive arms pivotally mounted on the frame, while replacing the belt-driven crank sheave with a slew-bearing or other toothed gear structure for improved reliability and wear-life of the drive system. Another possible combination could employ a belt or chain driven transmission arrangement like that of the first two embodiments in an overhead drive configuration like that of the third embodiment, thereby avoiding the need for the slotted carrier bar supports 3 of the first two embodiments.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A reciprocating pump drive apparatus for operating a downhole pump via a rod string, the apparatus comprising:
    a frame comprising a base plate having an opening therein to accommodate passage of the rod string through said base plate, and two parallel side walls standing vertically upright from the base plate at opposing sides thereof, said base plate having a plurality of bolt holes disposed around said opening for bolting of said frame to a wellhead in a mounted position thereon;
    a pair of parallel vertical guide slots opening through the two side walls of the frame and extending upwardly away from the base plate of the frame;
    a crank supported by at least one of the side walls for rotation about a rotational axis of the crank at a position between said side walls;
    a carrier device comprising a carrier bar and a pair of guide followers rotatably carried on the carrier bar adjacent opposing ends thereof and each movably engaged in a respective one of the pair of parallel vertical guide slots for movement therealong, the carrier bar being arranged to carry a pump rod in a position depending downward therefrom through the opening in the base plate;
    a drive arm device coupled to the carrier bar adjacent a first end of the drive arm device, coupled to the crank adjacent a second end of the drive arm device, and being arranged to convert rotational motion of the crank into reciprocating linear motion of the carrier device along the first pair of parallel slots in the side walls of the frame to drive reciprocation of the pump rod; and
    a drive source mounted to at least one of the side walls and coupled to the crank to drive rotation thereof;
    wherein the rotational axis of the crank is situated directly overhead of the carrier bar in a position spaced only vertically, and not horizontally, therefrom such that the carrier bar and the rotational axis of the crank reside in a same vertical plane that crosses perpendicularly through the side walls of the frame.

2. The apparatus of claim 1, comprising a stewing bearing, a first race of which defines the crank and a second race of which is mounted to the frame.

3. The apparatus of claim 2, wherein the drive source and the second race of the slewing bearing are mounted to a same one of the two side walls.

4. The apparatus of claim 2, wherein the drive source comprises a motor mounted to an exterior side of said one of the two side walls, and the second race of the stewing bearing is mounted to an opposing inner side of said one of the two side walls.

5. The apparatus of claim 1, wherein the drive source and the crank are supported on a same one of the two side walls.

6. The apparatus of claim 5, wherein the drive source comprises a motor mounted to an exterior side of said one of the two side walls, and the crank is supported on an opposing inner side of said one of the two side walls.

7. The apparatus of claim 1, wherein each guide follower comprises a flange that resides outside the respective one of the pair of guide slots and has a diameter that exceeds a width of said respective guide slot, whereby the flanges define stops to block lateral sliding of the carrier bar.

* * * * *